US008021158B2

(12) United States Patent
Eras et al.

(10) Patent No.: US 8,021,158 B2
(45) Date of Patent: Sep. 20, 2011

(54) MEASUREMENT INSTRUCTION APPARATUS

(76) Inventors: Laura Eras, Paso Robles, CA (US); Charles Eras, Paso Robles, CA (US)

( * ) Notice: Subject to any disclaimer, the term of this patent is extended or adjusted under 35 U.S.C. 154(b) by 1026 days.

(21) Appl. No.: 11/864,674

(22) Filed: Sep. 28, 2007

(65) Prior Publication Data
US 2008/0261184 A1    Oct. 23, 2008

Related U.S. Application Data

(60) Provisional application No. 60/912,454, filed on Apr. 18, 2007.

(51) Int. Cl.
*G09B 19/02* (2006.01)
*B43L 7/00* (2006.01)
*B43L 13/00* (2006.01)

(52) U.S. Cl. ............................. 434/187; 33/494; 33/454

(58) Field of Classification Search .................. 434/187; 33/454, 476, 494, 700, 483, 679.1
See application file for complete search history.

(56) References Cited

U.S. PATENT DOCUMENTS

| | | | |
|---|---|---|---|
| 1,776,245 A | 9/1930 | Barrett | |
| 2,926,432 A | 3/1960 | Helberg | |
| 3,728,800 A * | 4/1973 | Magram | 434/171 |
| 4,614,042 A | 9/1986 | Maurer | |
| 4,750,270 A * | 6/1988 | Kundikoff | 33/494 |
| 5,335,421 A | 8/1994 | Jones, Jr. | |
| 5,501,019 A | 3/1996 | Concari et al. | |
| D376,326 S | 12/1996 | Wilson | |
| 5,746,001 A | 5/1998 | Fisher | |
| 5,873,171 A * | 2/1999 | Hsu | 33/484 |
| 5,881,469 A | 3/1999 | Monck | |
| 5,884,408 A | 3/1999 | Simmons | |
| 6,145,210 A | 11/2000 | Walczynski | |
| 6,192,594 B1 * | 2/2001 | Wackowski | 33/494 |
| 6,813,841 B1 | 11/2004 | Ramsey | |
| 6,964,110 B2 * | 11/2005 | Shapiro | 33/458 |
| 7,076,881 B1 | 7/2006 | Perry | |
| 7,415,772 B1 * | 8/2008 | Ferretti | 33/494 |

OTHER PUBLICATIONS

Primary Safe-T Ruler, Classroom Products, Model No. 43042, www.classroomproductswarehouse.com; Classroom Products Warehouse; 225 N. Fairway Drive; Vernon Hills, Il 60061.

* cited by examiner

*Primary Examiner* — Kathleen Mosser
*Assistant Examiner* — Peter Egloff
(74) *Attorney, Agent, or Firm* — Philip A Steiner

(57) ABSTRACT

A multi-scaled instructional apparatus is provided in which a plurality of measurement scales are disposed on a base medium. Each of the measurements scales are longitudinally aligned such that equal units of measure are commonly aligned among all of the measurement scales. A first measurement scale is provided in which a plurality of uniquely color-coded base units of measurement are periodically disposed on the base medium. A second measurement scale, uniformly aligned and adjacent to the first measurement scale includes a plurality of color-coded subunits of measurement periodically disposed on the base medium. Each set of subunits equaling one half of each base unit and color-coded in a color shade corresponding to the color of the base unit. An elongated element is provided to receive the base medium.

20 Claims, 8 Drawing Sheets

MEASUREMENT INSTRUCTION APPARATUS

CROSS-REFERENCE TO RELATED APPLICATIONS

This application is a non-provisional application claiming benefit and priority under 35 U.S.C. §119(e) from applicant's U.S. provisional application Ser. No. 60/912,454, filed on Apr. 18, 2007, to the instant inventors; said provisional application is hereby incorporated by reference in its entirety as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

RELEVANT INVENTIVE FIELD

The various exemplary embodiments relate generally to educational instruction aids and more specifically to an apparatus for instruction of units of measurement.

BACKGROUND

Students frequently encounter considerable difficulty in grasping the concepts of measurement. For example, a student needs a fundamental level of understanding of the basic units of measure before being able to competently apply the knowledge when using measuring devices such as rulers. Units of measure having fractional components of larger measurement units are conceptually difficult for a student to comprehend since measuring is generally a new experience involving unusual terms and apparently unrelated measurement units. As such, a simple instructional measuring apparatus which assists students in comprehending basic units of measure and how those units of measure are determined would be highly desirable.

SUMMARY

The various exemplary embodiments disclosed herein address the deficiencies of the relevant art and provides exemplary embodiments of a multi-scaled instructional apparatus. In an exemplary embodiment, a plurality of measurement scales are disposed on a base medium in which each of the measurements scales are longitudinally aligned such that equal units of measure are commonly aligned among all of the measurement scales. A first measurement scale is provided in which a plurality of uniquely color-coded base units of measurement are periodically disposed on the base medium. A second measurement scale, uniformly aligned and adjacent to the first measurement scale includes a plurality of color-coded subunits of measurement periodically disposed on the base medium.

Each set of subunits equaling one half of each base unit and color-coded in a color shade corresponding to the color of the base unit. An elongated element is provided to receive the base medium. In various exemplary embodiments, the base medium may be disposed on the or within the elongated element.

In an exemplary embodiment, a third measurement scale is provided. The third measurement scale includes another set of color-coded subunits of measurement periodically disposed on the base medium in which each of the second subunits equals one half of each first subunit. Each of the second subunits is likewise color-coded in a color shade corresponding to the previous measurement subunit and the base measurement unit.

In an exemplary embodiment, a fourth measurement scale is provided. The fourth measurement scale incorporates the base, first and second units of measure periodically disposed on the base medium.

In various exemplary embodiments, each base unit of measure equals one inch and each of the measurement scales equals one foot in length.

In another exemplary embodiment, the base medium is foldable along common long axes between the first, second and third measurement scales to form an elongated rectangular shape.

In yet another exemplary embodiment, the elongated element is an elongated rectangular tube dimensioned to receive the elongated rectangular shape.

In still another exemplary embodiment, gender specific end caps are coupled to the ends of the elongated rectangular tube. The gender specific end caps allow one measurement apparatus to be longitudinally coupled to another measurement apparatus.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments as is defined by the claims.

DETAILED DESCRIPTION

Figure 1:
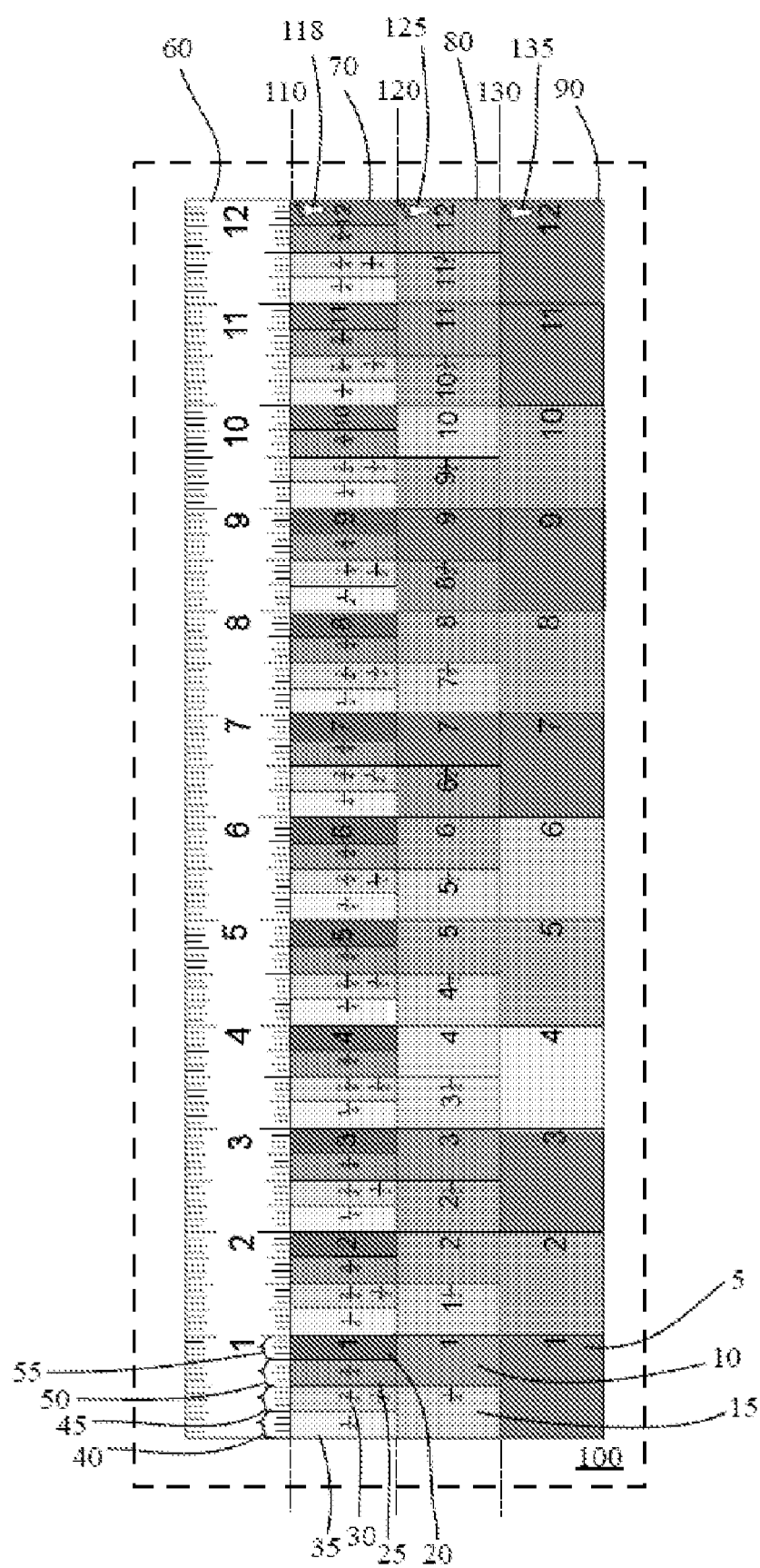
FIG. 1—depicts an exemplary embodiment of a planar measurement instruction apparatus having multiple fractional measurement scales.

Instructing students in units of measurements is difficult to accomplish due the student's lack of understanding of how different units of measure interrelate to one another. This is made more difficult when the individual units of measure involve fractional values such as those encountered when instructing a student in units of measure associated with English units of measure. Attempting to verbally explain the differences between the various units is usually insufficient to provide the necessary level of understanding for a student to comprehend the units of measure found on common elementary school rulers.

In various exemplary embodiments, a measurement instruction apparatus is disclosed for the instruction of elementary school and remedial students for the purposes of learning measurement. The measurement instruction apparatus allows for teaching in a progressive manner from basic units of measurement (e.g., an inch) to a next smaller division of half inch increments, and ultimately to the smallest divisions of eighth inch increments. In addition, a progressive color coding system allows for the visual perspective of the distance that an inch occupies, as well as the way an inch divides into fractional components of half and quarter inch increments.

The measurement divisions are disposed on a base medium preferably so that no scale offset is required for measuring. Measurements are performed by the student beginning at the left edge and end at the right edge of the ruler. Offsets in the start and end of the measurement scales can be confusing to a young student if the measurement scale starts and ends somewhere along the length of the ruler.

The base medium upon which the measurement instruction apparatus is disposed may be constructed from relatively thin strips of polymeric material; by way of example and not limitation; PVC, ABS, Plexiglas, acrylic or similar plastics. Alternately, heavy bond paper materials or cardboard may used for the base medium. Wood based products may also be used as an alternative if desired.

Since the measurement instruction apparatus may be used in the instruction of young students, it is important to select materials which do not leach toxins either through handling and/or oral contact. The measurement division markings and coloring of each ruler may be applied by a stamp, silkscreen, dye sublimation, engraving and/or etching process. As previously discussed, it is important to limit exposure of toxins to the young students. Therefore, a clear seal coat of polypropylene may be applied to seal the base polymeric materials, including the applied markings and colorings if directly accessible by the students.

In another exemplary embodiment, the measurement division markings may be painted or etched onto the base medium using stencils. In yet another exemplary embodiment, the measurement division markings may be embodied as one or more decals which are then affixed to the top surface(s) of the base medium selected for the apparatus.

The polymeric strips are intended to be twelve inches long by approximately one inch wide and anywhere from an eighth to a quarter inch in thickness. The thickness and width of the measurement instruction apparatus is not critical, only sufficient thickness is needed to provide durability of the measurement instruction apparatus which is somewhat dependent on the construction materials used. The length of the base medium should preferably be as close to one foot as possible so that measurements begin at the left edge of the ruler and end at the right edge for a foot. The width of the measurement instruction apparatus is largely a matter of convenience and manufacturing costs.

Referring to FIG. 1, an exemplary embodiment of a multi-scale measurement instruction apparatus is depicted. In this exemplary embodiment, a first measurement scale 90 having periodic one inch divisions 5 is disposed on a top planar surface of a base medium 100. In an exemplary embodiment, each one inch division 5 on the first measurement scale is assigned a unique base color code. The one inch divisions 5 are disposed on the top surface of the base medium 100 such that measurements begin immediately at a left edge of the measurement scales 60, 70, 80, 90 and end immediately at the right edge of the of the measurement scales 60, 70, 80, 90, such that the twelfth inch division ends at the right edge of the measurement scales 60, 70, 80, 90. The base medium 100 upon which the measurement scales 60, 70, 80, 90 are disposed is shown slightly larger in FIG. 1 for illustrative purposes only. The base medium 100 in which the various measurements scales are disposed 60, 70, 80, 90 should preferably be trimmed or cut to accomplish the start and end of the measurement scales 60, 70, 80, 90. In an embodiment, the various measurements scales are disposed on heavy paper preferably 78 lb floss cut to 5"×12".

In an embodiment, one or more foot icons 115, 125, 135 are provided adjacent to the 12 inch division mark on at least the color coded measurement scales 70, 80, 90 to graphically illustrate that twelve inches equals one foot in the English measurement system. One skilled in the art will appreciate that other units of measure, such as the metric system may be disposed on the base medium 100 in addition to or in replacement of the English measurement units. The measurement scales 60, 70, 80, 90 are disposed on the base medium 100 and intended to be read from left to right as is the English language. However, the scale may be reversed in order to accommodate reading from right to left for foreign languages, such as Hebrew or Arabic.

The second measurement scale 80 includes the same lengthwise dimensions of the first scale 90 and is disposed on the base medium 100 such that each inch division 5 on the first scale 90 is equally subdivided into half inch subdivisions 10, 15 on the second scale 80. The color-codes applied to the half inch subdivisions 10, 15 on the second scale 80 are color shade variations of the base color-code of the corresponding one inch 5 division on the first measurement scale 90. The color coded scales facilitates visual continuity between each of the progressively smaller subdivisions 10, 15, 20, 25, 30, 35 on the remaining scales 80, 70 from the initial base unit inch division 5 on the first measurement scale 90.

The third measurement scale 70 includes the same lengthwise dimensions of the first 90 and second measurement scales 80 and is disposed on the base medium 100 such that each half inch subdivision 10, 15 on the second scale 80 is equally subdivided into quarter inch divisions 20, 25, 30, 35 on the third scale 70.

In an optional exemplary embodiment, a fourth measurement scale 60 is disposed on the base medium 100 such that each quarter, half and one inch divisions 20, 25, 20, 35, 10, 15, 5 on the first, second and third measurement scales 90, 80, 70 are aligned with the corresponding divisions 40, 45, 50, 55 on the fourth measurement scale 60. The fourth measurement scale 60 is intended to integrate the fractional learning progression made from the previous measurement scales 90, 80, 70 to arrive at a typical twelve inch ruler 60. Addition subdivisions on the fourth measurement scale 60 may be provided to include eighth inch measurement units.

In an exemplary embodiment, a first longitudinal flexible coupling 130 is provided between the first measurement scale 90 and the second measurement scale 80. The coupling 130 may be configured as a fold, seam or joint which allows the first measurement scale 90 to rotate about a common long axis with the second measurement scale 80.

The first flexible coupling is comprised of a resilient polymer, elastomeric compound, durable cloth tape, paper or simply a fold in the base medium.

Figure 6:
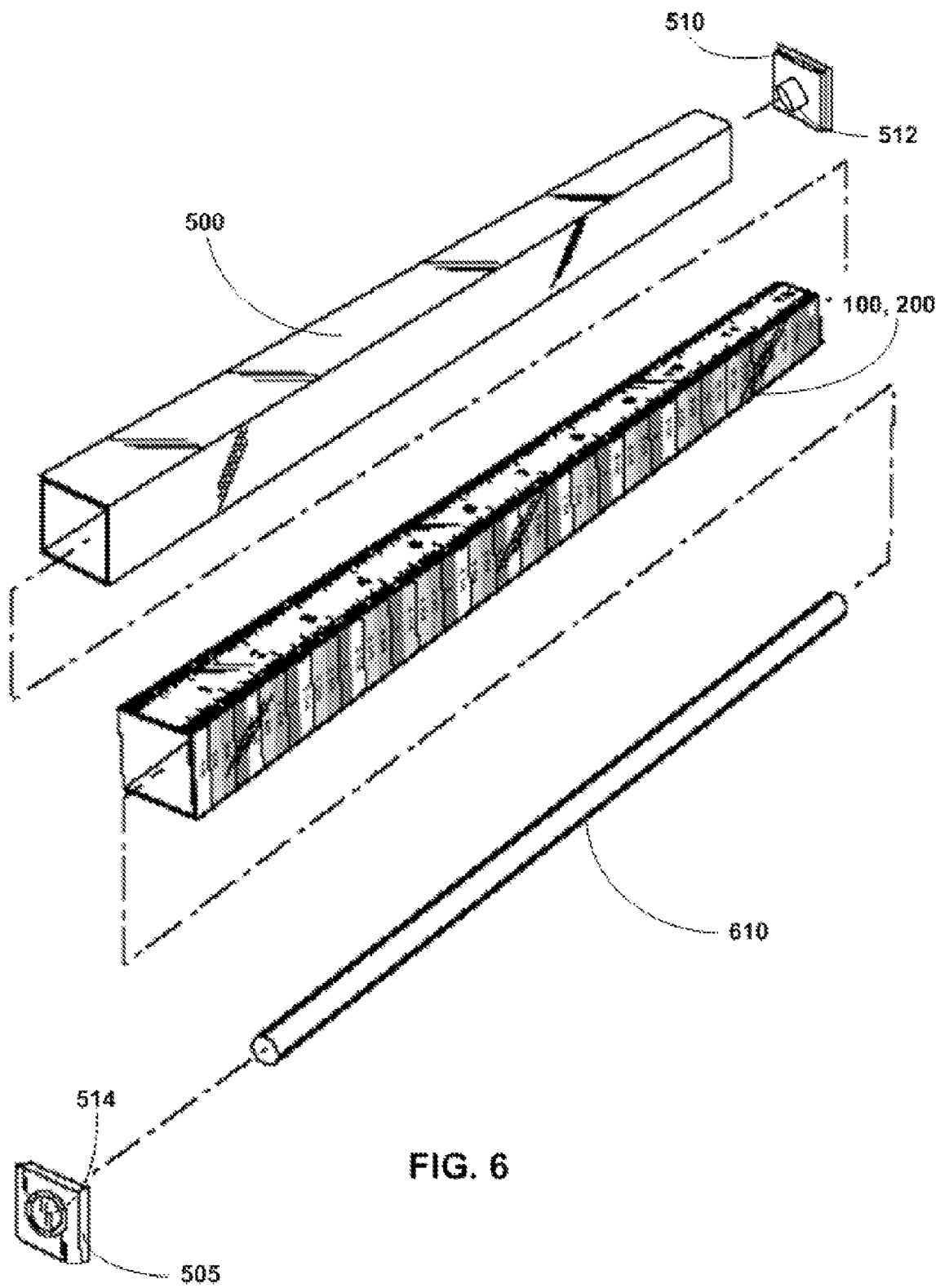
FIG. 6—depicts an exploded perspective view of an exemplary embodiment of the measurement instruction apparatus configured as a multi-scaled rectangular ruler.
Figure 7:
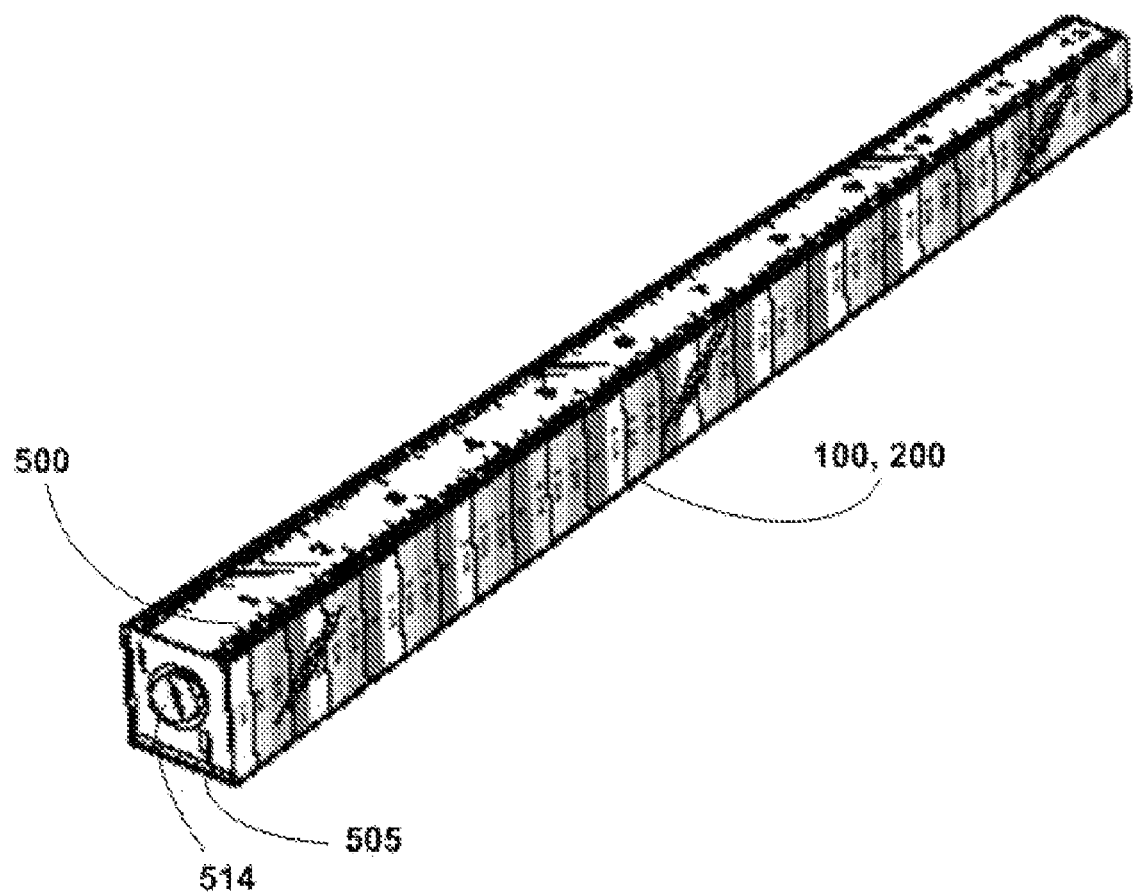
FIG. 7—depicts a perspective view of an exemplary embodiment of the measurement instruction apparatus configured as a multi-scaled rectangular ruler.

In an exemplary embodiment, one or more flexible couplings 110, 120, 130 may be provided to allow each measurement scale 90, 80, 70, 60 to be used or viewed separately. In an exemplary embodiment, a first flexible coupling 130 allows the first and second measurement scales 90, 80 to rotate about a common long axis. In another exemplary embodiment, a second flexible coupling 120 is provided which allow the second and third measurement scales 80, 70 to rotate about a common long axis. In a third exemplary embodiment, a third flexible coupling 110 is provided which allow the third and fourth measurement scales 70, 60 to rotate about a common long axis. Each flexible coupling 110, 120, 130 may be provided separately or included with one or more of additional flexible couplings. When more than one flexible coupling is provided, the flexible couplings are aligned in parallel to the common long axis to allow the base medium 100 to form an elongated triangle or square as is depicted in FIGS. 6 and 7.

Figure 2:
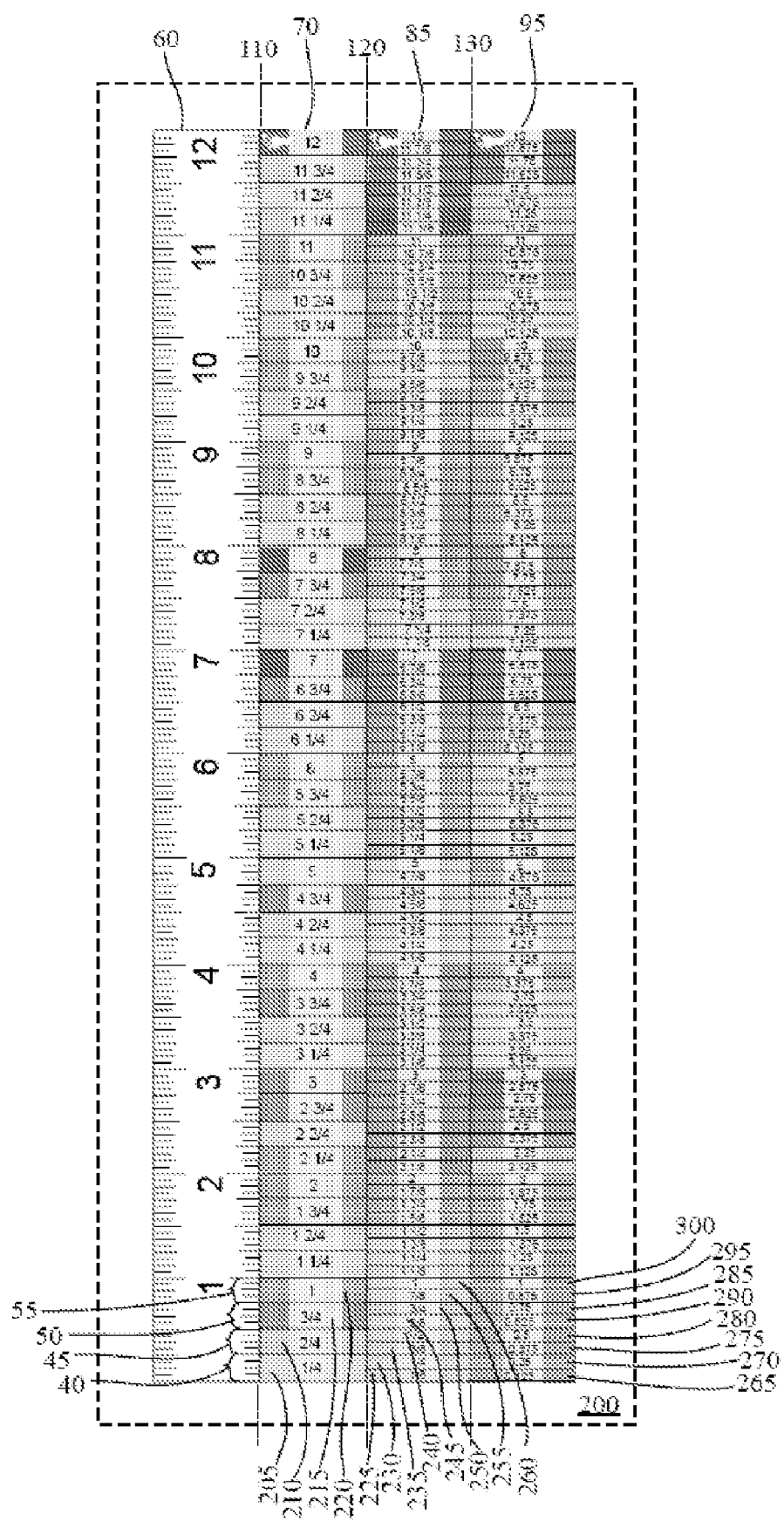
FIG. 2—depicts an exemplary embodiment of a planar measurement instruction apparatus having both fractional and decimal equivalent measurement scales.

Referring to FIG. 2, another exemplary embodiment of a multi-scale measurement instruction apparatus is depicted. In this exemplary embodiment, a first measurement scale 70 having periodic quarter inch divisions 205, 210, 215, 220 is disposed on a top planar surface of a base medium 200. In an exemplary embodiment, each quarter inch division 205, 210, 215, 220 on the first measurement scale 70 is assigned a unique base color code. The quarter inch divisions 205, 210, 215, 220 are disposed on the top surface of the base medium 200 such that measurements begin immediately at a left edge of the measurement scales 60, 70, 85, 95 and end immediately at the right edge of the measurement scales 60, 70, 85, 95 such that the final quarter inch division ends at the right edge 209 of the of the measurement scales 60, 70, 85, 95.

As previously discussed above, the base medium 200 upon which the measurement scales 60, 70, 85, 95 are disposed is shown slightly larger in FIG. 2 for illustrative purposes only. The base medium 200 in which the various measurements scales are disposed 60, 70, 85, 95 should preferably be trimmed or cut to accomplish the start and end of the measurement scales 60, 70, 85, 95.

As discussed in the previous exemplary embodiment, one or more foot icons 115, 125, 135 are provided adjacent to the 12 inch division mark on at least the color coded measurement scales 70, 85, 95 to graphically illustrate that twelve inches equals one foot in the English measurement system. The second measurement scale 85 includes the same lengthwise dimensions of the first measurement scale 70 and is disposed on the base medium 200 such that each quarter inch division 205, 210, 215, 220 on the first measurement scale 70 is equally subdivided into eighth inch subdivisions 225, 230, 235, 240, 245, 250, 255, 260 on the second measurement scale 85. The color-codes applied to the eighth inch subdivisions 225, 230, 235, 240, 245, 250, 255, 260 on the second measurement scale 85 are color shade variations of the base color-code of the corresponding quarter inch divisions 205, 210, 215, 220 on the first measurement scale 70. As previously discussed, the color coding facilitates visual continuity between each of the progressively smaller subdivisions 225, 230, 235, 240, 245, 250, 255, 260, 265, 270, 275, 280, 285, 290, 295, 300 on the remaining scales 85, 95 from the initial base unit quarter inch divisions 205, 210, 215, 220 on the first measurement scale 70.

The third measurement scale 95 includes the same lengthwise dimensions of the first 70 and second measurement scales 85 and is disposed on the base medium 200 such that each eighth inch subdivision 225, 230, 235, 240, 245, 250, 255, 260 on the second scale 85 is provided in a decimal equivalent of eighths of an inch on the third scale 95.

As with the previous exemplary embodiment, an optional fourth measurement scale 60 is disposed on the base medium 200 superjacent to the first measurement scale 70 such that each quarter inch 205, 210, 215, 220, eighths of an inch 225, 230, 235, 240, 245, 250, 255, 260 and decimal equivalent subdivisions 265, 270, 275, 280, 285, 290, 295, 300 on the first, second and third measurement scales 70, 85, 95 are aligned with the corresponding divisions 40, 45, 50, 55 on the fourth measurement scale 60.

Again as previously discussed, the fourth measurement scale 60 is intended to integrate the fractional learning progression made from the previous measurement scales 70, 85, 95 to arrive at a typical twelve inch ruler 60. Addition subdivisions on the fourth measurement scale 60 may be provided which include eighths of an inch measurement units.

Again as previously discussed, a first longitudinal flexible coupling 120 may be provided between the first measurement scale 70 and the second measurement scale 85. The coupling 120 may be a fold, seam or joint which allows the first measurement scale 70 to rotate about a common long axis with the second measurement scale 85.

The first flexible coupling 120 may be comprised of a resilient polymer, elastomeric compound, durable cloth tape, paper or simply a fold in the base medium. In another exemplary embodiment, a second flexible coupling 130 is provided which allow the second and third measurement scales 85, 95 to rotate about a common long axis. In a third exemplary embodiment, a third flexible coupling is provided 110 which allow the first and fourth measurement scales 70, 60 to rotate about a common long axis. Each flexible coupling 110, 120, 130 may be provided separately or included with one or more additional flexible couplings. When more than one flexible coupling is provided, the flexible couplings are aligned in parallel to the same common long axis to allow the base medium 200 to form an elongated triangle or rectangle as is depicted in FIGS. 3 and 4.

Figure 3:
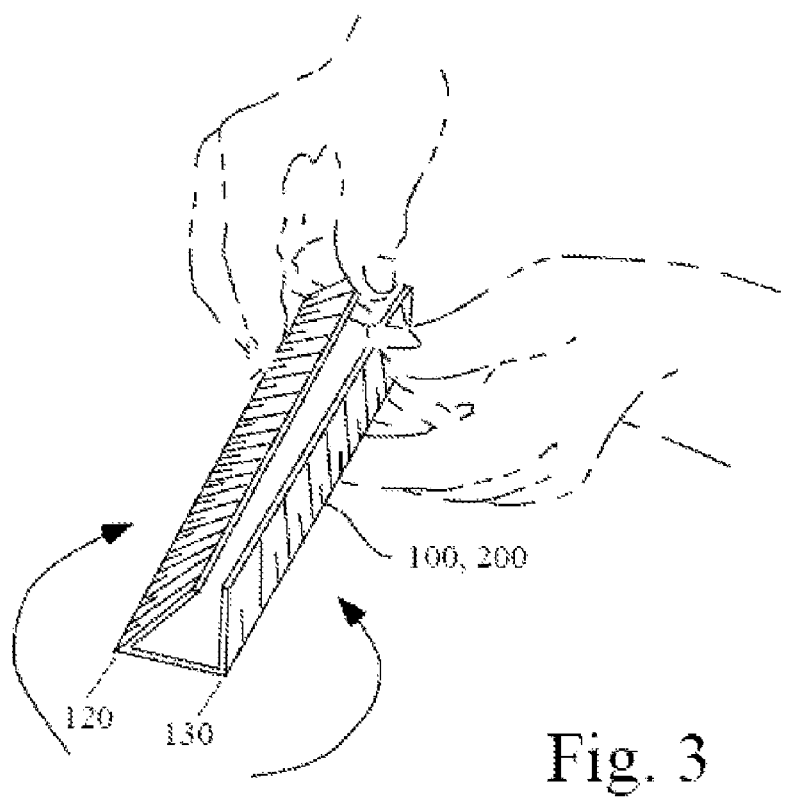
FIG. 3—depicts a first exemplary configuration of a base medium in a triangular form factor.

Referring to FIG. 3, assembling a triangular configuration of the base medium 100, 200 is performed by simply rotating or folding the apparatus along parallel lengths of the flexible couplings 120, 130 to form the triangular configuration shown in FIG. 3. The triangular configuration may also be formed by simply rotating or folding the apparatus along the parallel lengths of the flexible couplings 110, 120, 130 and overlapping the two end measurement scales to form the triangular configuration shown in FIG. 3.

Figure 4:
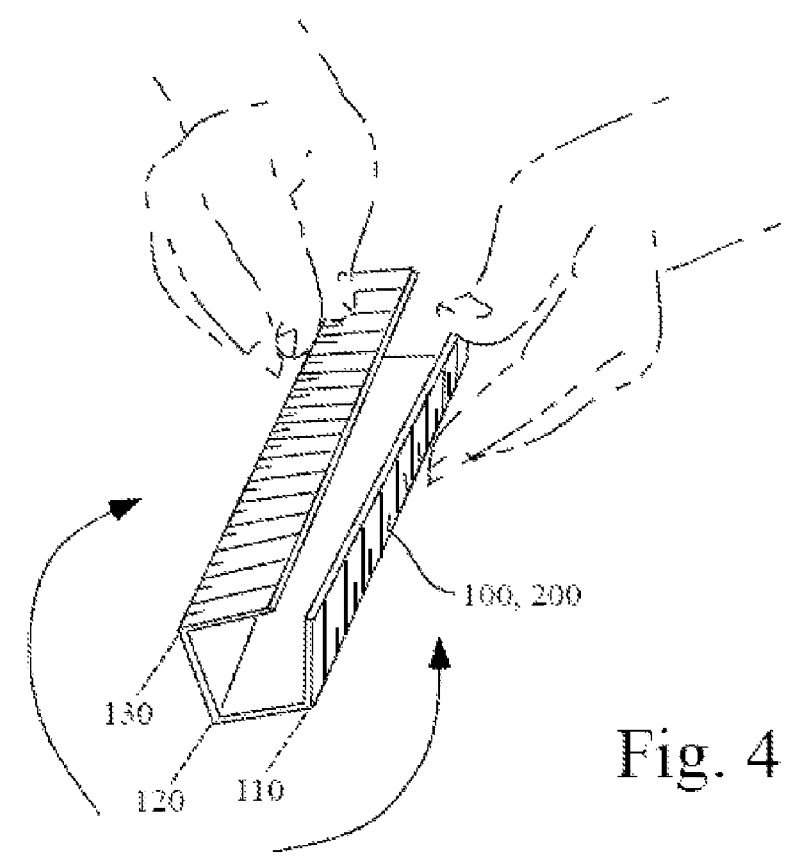
FIG. 4—depicts a first exemplary configuration of a base medium in a rectangular form factor.
Figure 5:
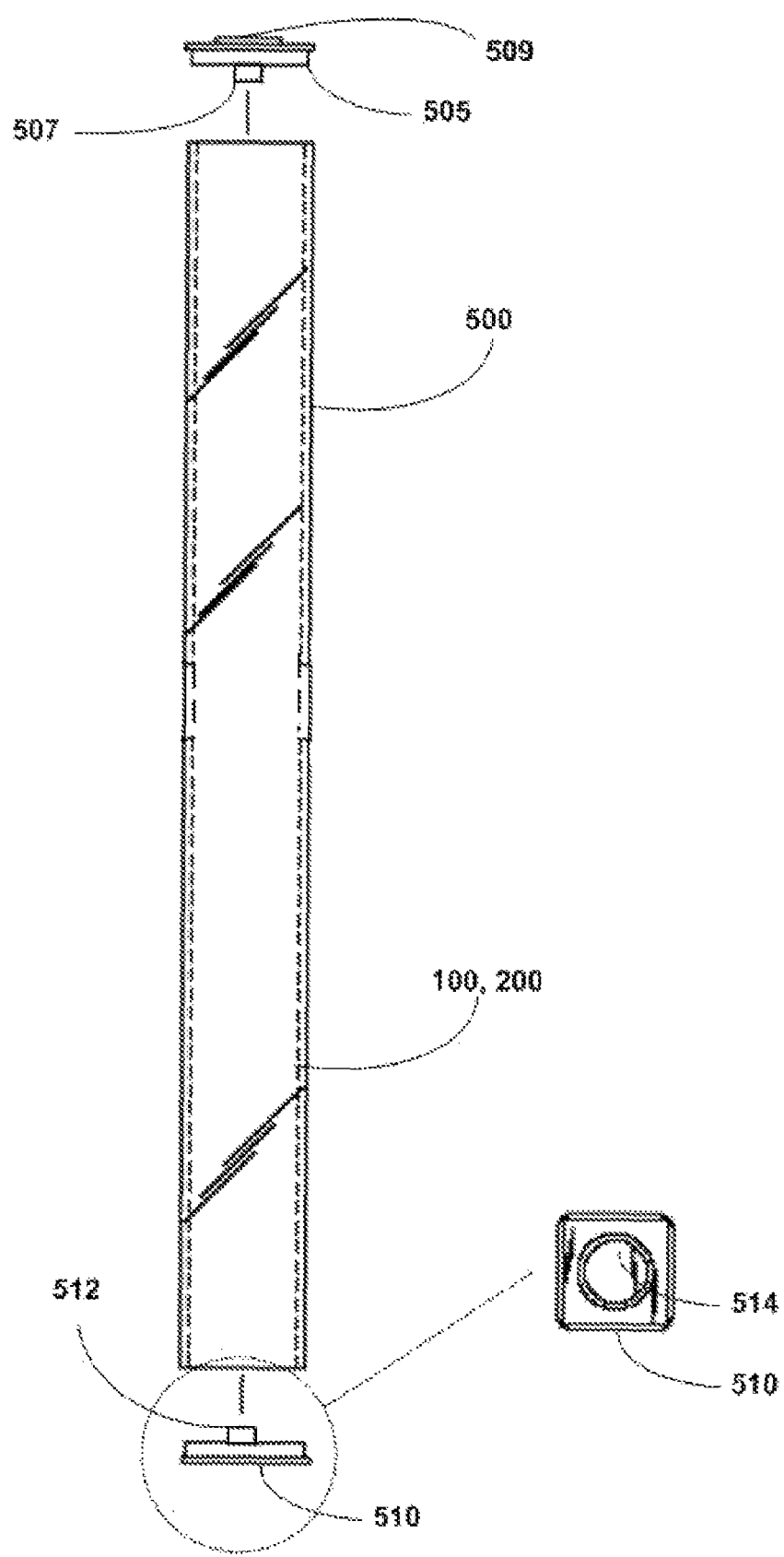
FIG. 5—depicts an exploded view of an exemplary embodiment of the measurement instruction apparatus configured as a multi-scaled rectangular ruler.

Alternately, assembling an elongated rectangular configuration of the measurement instruction apparatus 100, 200 is performed by simply rotating or folding the apparatus along parallel lengths of the flexible couplings 120, 130 to form the rectangular configuration shown in FIG. 4. Another exemplary embodiment of the measurement apparatus is depicted in FIG. 5 in which a clear rectangular tube 500 is used to receive either embodiment (FIGS. 1 and 2) of the base medium 100, 200. In this exemplary embodiment, the selected base medium 100, 200 is configured in the elongated rectangular configuration shown in FIG. 4 and inserted into the rectangular tube 500 and dimensioned such that each measurement scale is separately visible on each side of the rectangular tube 500. In an embodiment, the tube is constructed from clear plastic having a length of 12 inches and each end having square openings measuring about 1.087 inches per side.

Referring to FIG. 5, end caps 505, 510 are provided to maintain the base medium within the rectangular tube 500. The end caps 505, 510 are dimensioned so as to provide an interference fit into the open ends of the rectangular tube 500. When inserted into or onto the ends of the tube 500, each end cap 505, 510 forms a square plug that covers the otherwise open ends of the rectangular plastic tube 500. The thickness of the end caps after insertion into or onto the tube 500 should preferably be maintained at or below $30/1000$'s of an inch to allow for reasonably accurate measuring beyond the length of a single apparatus. Each end cap 505, 510 include a socket 507, 512 for receiving the small diameter tube shown in FIG. 6.

The small diameter tube 610 is constructed of a generally rigid plastic formed from PVC. The small diameter tube includes a diameter dimensioned to snugly fit into each socket 507, 512 and span the length of the clear plastic tube 500. The small tube 610 provides additional structural integrity to measurement instruction apparatus and is bonded to the end caps 505, 510 using an adhesive. The adhesive prevents the assembled measurement instruction apparatus from being taken apart by younger students.

Figure 8:
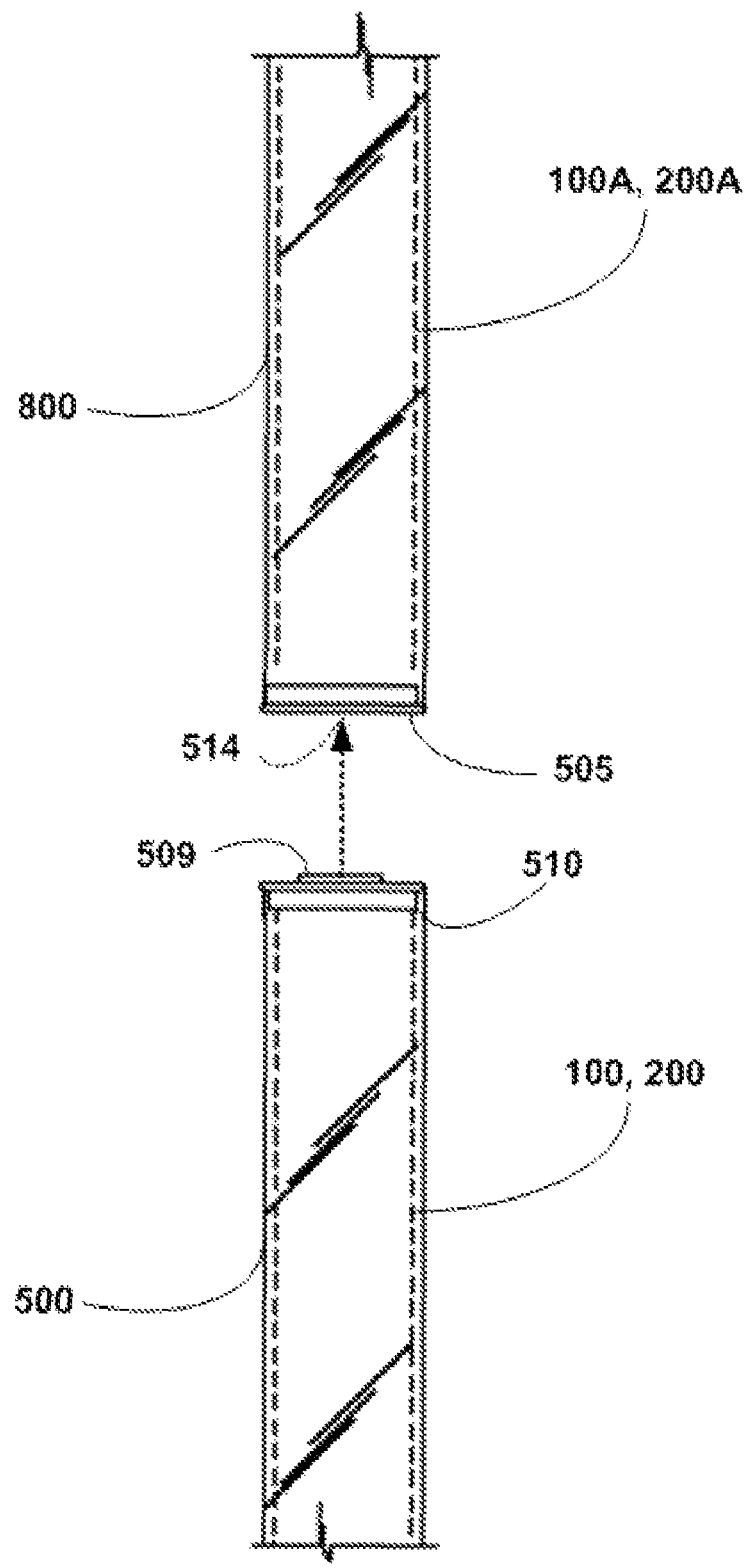
FIG. 8—depicts an exemplary embodiment of a first multi-scaled measurement instruction apparatus coupling with a second multi-scaled measurement instruction apparatus.

In an exemplary embodiment, each end cap further includes a male connector 509 and a female receptacle 514 which allows a first measurement instruction apparatus 500 to be longitudinally coupled to another measurement instruction apparatus 800 as is depicted in FIG. 8. The ability to connect two or more measure instruction apparatuses 500, 800 allows for expansion of the instruction into units of measurement, for example extending measurements to yards or meters. In this exemplary embodiment, the rectangular tube is constructed from a clear polyvinyl chloride (PVC) plastic. The end caps 505, 510 are likewise constructed from PVC. One skilled in the art will appreciate that the type of plastics used is not critical so long as toxic materials are not leachable therefrom.

Referring to FIG. 6, an exemplary exploded view of the measurement instruction apparatus is depicted. In this exemplary embodiment, a selected base medium 100, 200 is configured as a rectangular insert which approximates the dimensions of the inner perimeter of the clear plastic rectangular tube 500. The base medium 100, 200 is inserted coaxially into the rectangular tube 500 and adjusted where necessary so that a measurement scale is visible from each separate side of the rectangular tube 500. One end of the small diameter tube 610 is coated with an adhesive and bonded to one of the end caps 505. In an embodiment, the small diameter tube 610 is about 12 inches in length and has an outer diameter of about 0.299 inches. The assembly (first end cap 505 and small tube 610) is then inserted into the rectangular tube 500 such that the small tube 610 extends to the opposite end of the rectangular tube 500 and generally spans the longitudinal centerline of the rectangular tube 500. The first end cap 505 is then pressed into or onto the first end of the rectangular tube 500. Adhesive is then applied to the opposite end of the small tube 610 and/or the socket 512 of the second end cap 510. The second end cap 510 is then pressed into or onto the opposite end of the rectangular tube 500 along with the small tube 610 engaging the socket 512. Once the adhesive has had sufficient time to dry, the rectangular embodiment of the measurement instruction apparatus is available for instruction as is depicted in FIG. 7.

Figure 9:
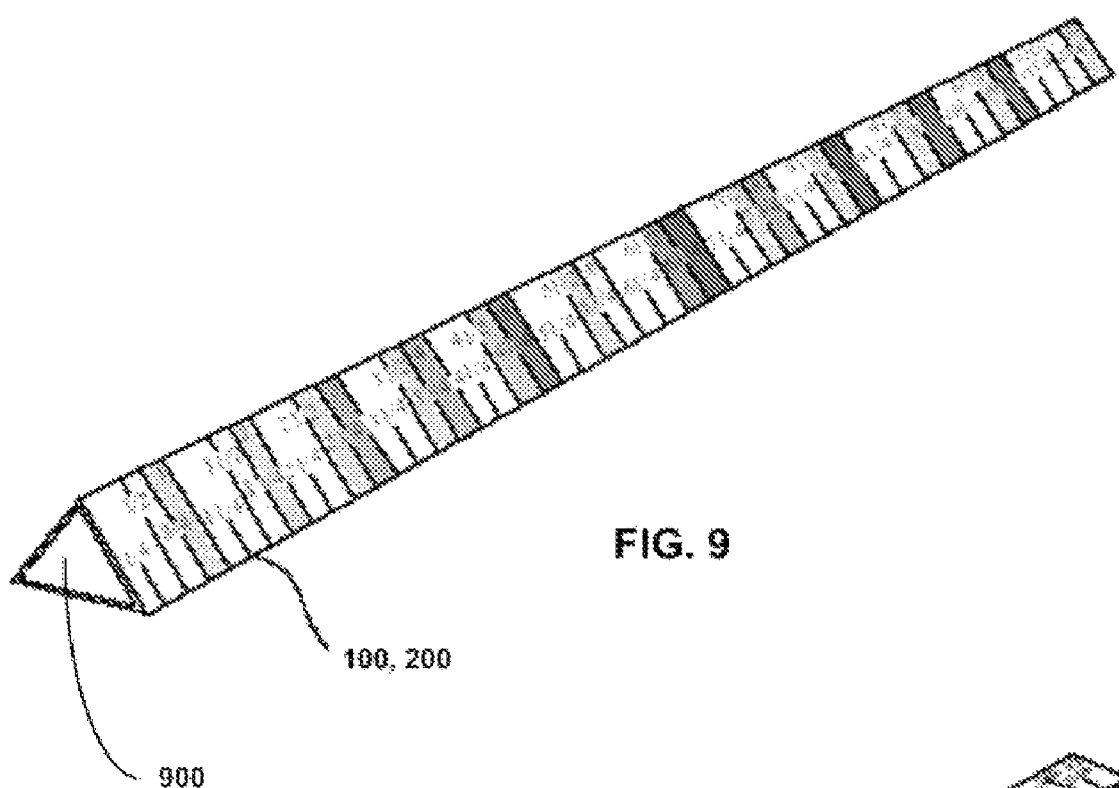
FIG. 9—depicts a perspective view of an exemplary embodiment of the measurement instruction apparatus configured as a triangular multi-scaled ruler.
Figure 10:
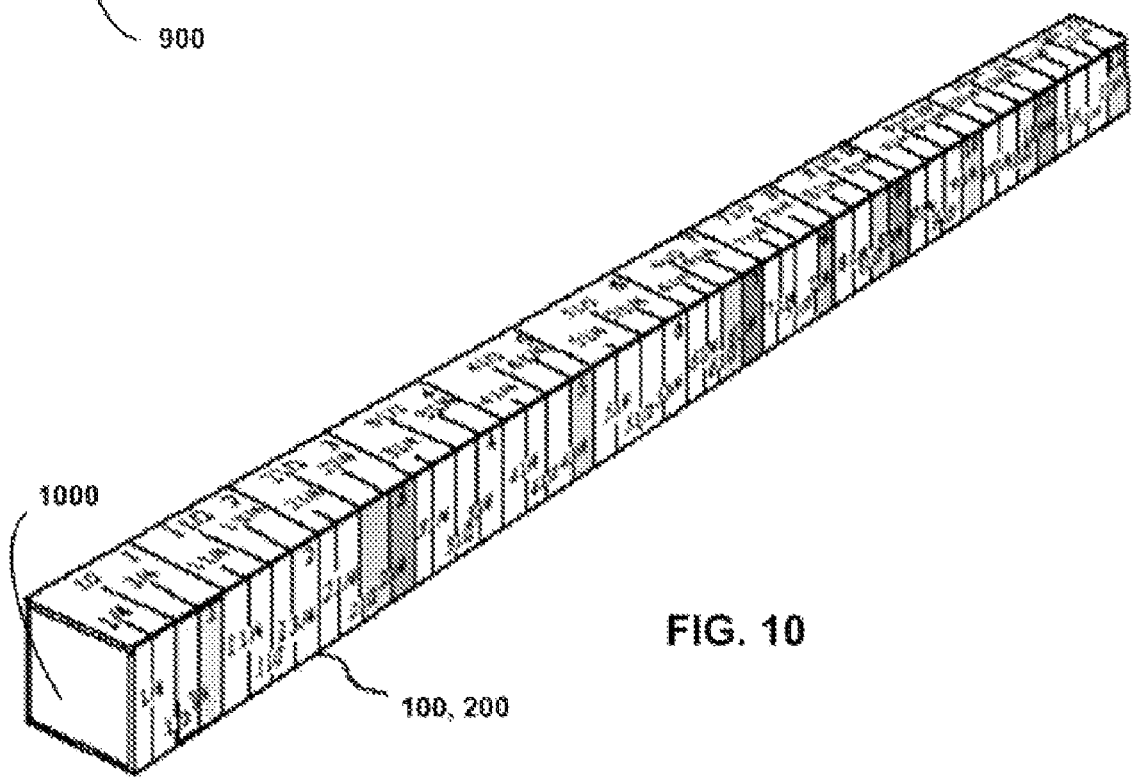
FIG. 10—depicts a perspective view of an exemplary embodiment of the measurement instruction apparatus configured as a rectangular multi-scaled ruler.

FIGS. 9 and 10 depict additional exemplary embodiments where each of the measurement scales is disposed on various sides of a unitary triangular or rectangular form 900, 1000. The triangular or rectangular forms 900, 1000 may be constructed from any relatively rigid material for example wood, plastic, or aluminum. In this exemplary embodiment, the forms comprise the base medium 100, 200 in which each of the measurement scales are disposed on the sides of the chosen form 900, 1000. The measurement scales are disposed on each side of the forms using for example, adhesive decals, painting, dye sublimation, etching and/or engraving processes. Each disposed measurement scale should be arranged such that consecutively smaller units of measure become visible as the chosen form 900, 1000 is rotated.

Instruction

Instruction usually begins by introducing the student to the base units of measurement. For instance, students are first taught what color code represents an inch on the base medium 100 shown in FIG. 1. In this example, the first inch 5 is represented by the color blue on the base measurement scale 90. Instruction progresses to the next set of subdivisions on the second measurement scale 80 which divides the first inch 5 into equal half inch segments 10, 15 on the second measurement scale 80. Each segment is colored blue. However, the first half inch segment 15 is colored in a lighter shade of blue than the second half inch segment 10. The second half inch segment 10 is colored the same shade of blue as the first inch 5. The difference in color shading is intended to visually illustrate what components are needed to reach the base unit of measure; in this instance, one inch 5.

Instruction progresses as before by introducing the third measurement scale 70 which further subdivides the base unit of measure (i.e., inch 5) into quarter inch segments 35, 30, 25, 20. Once the concept of an inch has been accomplished, the student may be provided with instruction on how many inches equal a foot as is illustrated by the foot icons 115, 125, 135 at the end of the 12 inch divisions.

Instruction using the second embodiment depicted in FIG. 2 is performed analogously but further breaks down the quarter inch of base units into eighth inch subunits and decimal equivalent eighth inch subunits for more advanced fractional instruction. In either embodiment, measurements greater than twelve inches (e.g., feet and yards) may be performed by longitudinally connecting two or more measurement instruction apparatuses together.

The various exemplary inventive embodiments described herein are intended to be merely illustrative of the principles underlying the inventive concept. It is therefore contemplated that various modifications of the disclosed embodiments will, without departing from the inventive spirit and scope, be apparent to persons of ordinary skill in the art. They are not intended to limit the inventive embodiments to any precise form described. In particular, it is contemplated that functional implementation of the various inventive embodiments described herein.

Accordingly, the measurement instruction apparatus elements may be provided in any common clear polymeric material similar to the containers or disposed on a single sheet of heavy bond paper or cardboard. No specific limitation is intended to particular construction materials, units of measure, measurement scale order or measurement scale layout are intended or implied. Other variations and inventive embodiments are possible in light of above teachings, and it is not intended that this Detailed Description limit the inventive scope, but rather by the Claims following herein.

What is claimed:

1. An apparatus for measurement instruction comprising:
   a base medium having disposed thereon, a plurality of measurement scales, each of the measurements scales being longitudinally aligned such that equal units of measure are commonly aligned among all of the measurement scales;
   the plurality of measurement scales further comprising;
   a first measurement scale having a plurality of uniquely color-coded base units of measurement periodically disposed thereon;
   a second measurement scale having a plurality of first color-coded subunits of measurement periodically disposed thereon, each first subunit equaling one half of each base unit and color-coded in a shade of each corresponding base unit; and,
   an elongated element configured to receive the base medium;
   wherein the color-coded base and color-coded subunits form color-coded areas dimensioned to correspond in size to the units and the subunits of measure.

2. The apparatus according to claim 1 further comprising a third measurement scale having a plurality of color-coded second subunits of measurement periodically disposed thereon, each second subunit equaling one half of each first subunit, and color-coded in a shade of each corresponding first subunit.

3. The apparatus according to claim 2 further comprising a fourth measurement scale having the plurality of the base units, first subunits and second subunits of measure periodically disposed thereon.

4. The apparatus according to claim 1 wherein each base unit of measure equals one inch.

5. The apparatus according to claim 1 wherein each of the plurality of measurement scales equals a foot in length.

6. The apparatus according to claim 3 wherein the base medium is foldable along common long axes between the first, second and third measurement scales to form an elongated rectangular shape.

7. The apparatus according to claim 6 wherein an elongated rectangular tube is dimensioned to receive the elongated rectangular shape therein.

8. An apparatus for measurement instruction comprising:
an elongated element having at least three viewable sides;
from a first viewable side, a first measuring scale having a first set of color-coded periodic divisions disposed thereon;
from a second viewable side, a second measuring scale having a second set of color-coded periodic divisions disposed thereon, the second set of periodic divisions being an equally divided subset of the first set of periodic divisions;
from a third viewable side, a third measuring scale having a third set of color-coded periodic divisions disposed thereon, the third set of periodic divisions being an equally divided subset of the second set of periodic divisions; and,
wherein the color-coding of the second and third set of periodic divisions are differentiated by shades of color associated with the first set of color-coded periodic divisions;
wherein the color-coded periodic divisions and color-coded subdivisions form color-coded areas dimensioned in size to correspond to units and subunits of measure.

9. The apparatus according to claim 8 wherein the elongated element further comprises a fourth viewable side.

10. The apparatus according to claim 9 wherein from the fourth viewable side, a fourth measuring scale includes the first, second and third periodic divisions commonly disposed thereon.

11. The apparatus according to claim 9 wherein the elongated element is an elongated rectangular tube.

12. The apparatus according to claim 11 wherein the first, second, third and fourth measuring scales are disposed on the first, second, third and fourth viewable sides of the elongated rectangular tube.

13. The apparatus according to claim 11 wherein the elongated rectangular tube is constructed of a transparent plastic in which the first, second, third and fourth measuring scales are viewable therethrough.

14. The apparatus accord to claim 11 wherein the elongated rectangular tube further includes a first end cap and a second end cap configured to seal each end of the rectangular tube.

15. The apparatus according to claim 14 wherein the first end cap includes a male connector and the second end cap includes a complementary female connector.

16. The apparatus according to claim 15 wherein the male connector is configured to mate with a complementary female connector coupled to a second apparatus in an end to end arrangement along a common long axis.

17. The apparatus according to claim 8 wherein the first set of periodic divisions are one inch areas, the second set of periodic divisions are in half inch areas and the third set of periodic divisions are in quarter inch areas.

18. The apparatus according to claim 8 wherein the first set of periodic divisions are in quarter inch areas, the second set of periodic divisions are in eighth inch areas and the third set of periodic divisions are in decimal equivalents of the eighth inch areas.

19. An apparatus for measurement instruction comprising:
an elongated rectangular tube having four viewable sides;
from a first viewable side, a first measuring scale having a first set of color-coded measurement divisions incrementally disposed thereon;
from a second viewable side, a second measuring scale disposed at an angle to the first ruler and including a second set of color-coded measurement divisions incrementally disposed thereon, the second set of divisions being an even fractional subset of the first color-coded set of divisions;
from a third viewable side, a third measuring scale disposed at an angle to the second ruler and including a third set of color-coded measurement divisions incrementally disposed thereon, the third set of divisions being an even fractional subset of the first and second set of divisions;
from a fourth viewable side, a fourth measuring scale disposed at an angle to the third ruler including a fourth set of color-coded measurement divisions incrementally disposed thereon, the fourth set of divisions including the first, second and third set of divisions;
a male and a female end cap dimensioned to seal each end of the rectangular tube; the male and female end caps being configured to mate with an opposite gender end cap in an end to end arrangement to allow measurements beyond a single apparatus; and,
wherein the color-coding of the second and third set of measurement divisions are differentiated by color shades which correspond to the first set of color-coded measurement divisions;
wherein the color-coded divisions and color-coded subdivisions form color-coded areas dimensioned in size to correspond to units and subunits of measure.

20. The apparatus according to claim 19 wherein at least the first measurement scale includes an icon of a foot disposed on top surface thereof.

* * * * *